United States Patent [19]
Mandell et al.

[11] Patent Number: 5,386,434
[45] Date of Patent: Jan. 31, 1995

[54] INTERNAL MIRROR SHIELD, AND METHOD FOR PROTECTING THE MIRRORS OF AN INTERNAL GAS LASER

[75] Inventors: Gilbert E. Mandell, Mountain View; Dale E. Crane, Pleasanton, both of Calif.

[73] Assignee: Uniphase Corporation, San Jose, Calif.

[21] Appl. No.: 17,123

[22] Filed: Feb. 12, 1993

[51] Int. Cl.⁶ .................................... H01S 3/034
[52] U.S. Cl. ................................ 372/103; 372/61; 372/107
[58] Field of Search ............... 372/55, 61, 65, 92, 372/98, 99, 103, 107, 108, 59

[56] References Cited

U.S. PATENT DOCUMENTS

| | | | |
|---|---|---|---|
| 3,452,295 | 6/1969 | Sher | 331/94.5 |
| 3,760,296 | 9/1973 | Hernqvist | 372/61 X |
| 3,801,929 | 4/1974 | Kawasaki | 372/61 X |
| 4,378,600 | 3/1983 | Hobart | 372/62 |
| 4,439,862 | 3/1984 | Mohler | 372/107 |
| 4,477,907 | 10/1984 | McMahan | 372/64 |
| 4,689,796 | 8/1987 | Wright | 372/59 X |
| 4,698,818 | 10/1987 | Heynisch et al. | 372/34 |
| 4,752,937 | 6/1988 | Gorisch et al. | 372/88 |
| 5,020,070 | 5/1991 | Lombardo | 372/65 |
| 5,048,046 | 9/1991 | Welsch et al. | 372/87 |
| 5,124,998 | 6/1992 | Arrigoni et al. | 372/61 |

*Primary Examiner*—John D. Lee
*Attorney, Agent, or Firm*—Flehr, Hohbach, Test, Albritton & Herbert

[57] ABSTRACT

An internal mirror argon ion gas tube is described having protective sleeve barriers at opposite ends to prevent any particulate matter which might emanate from a weakened section of the mirror holder at the corresponding end from reaching the interior face of the mirror.

15 Claims, 1 Drawing Sheet

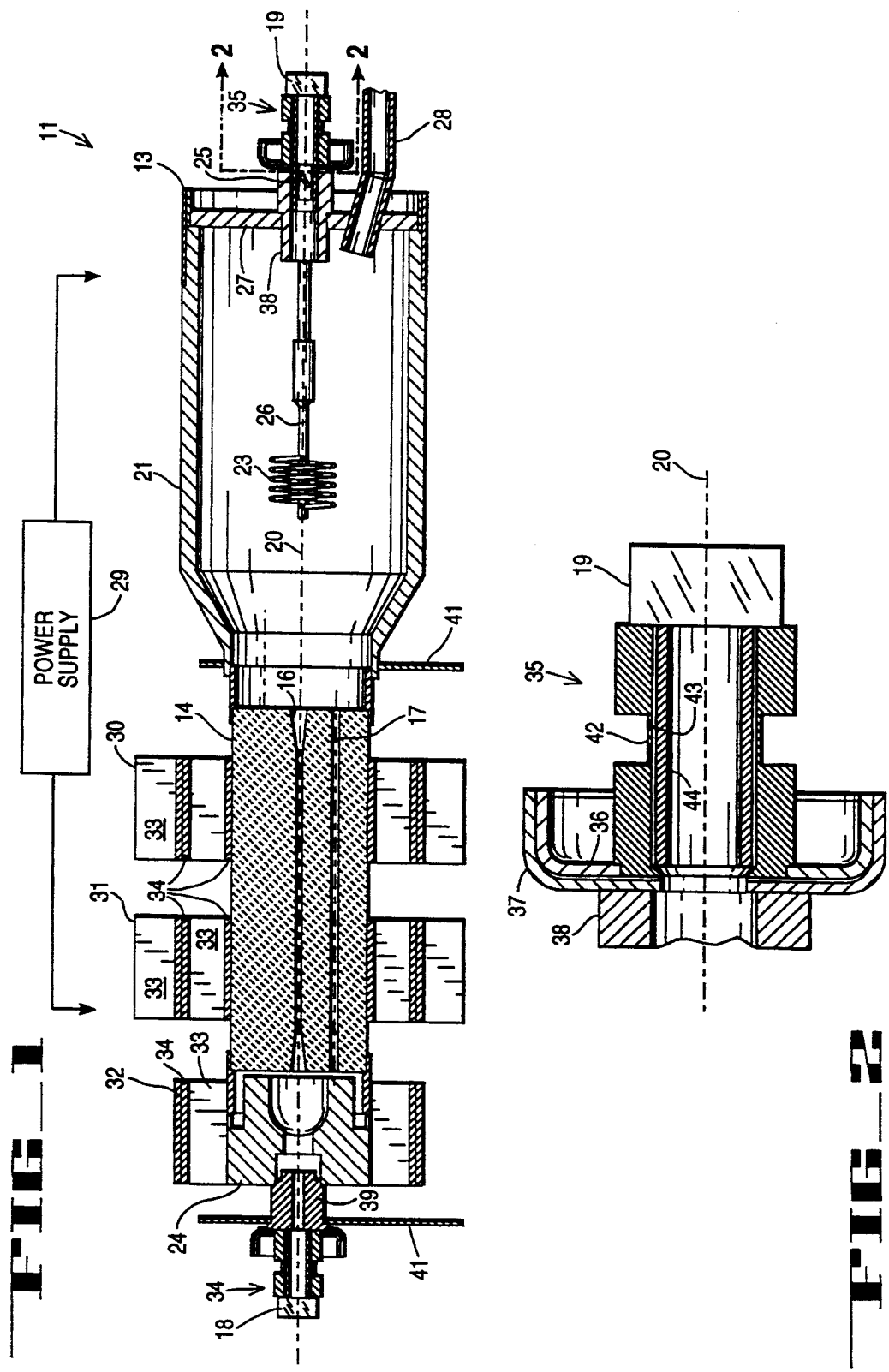

5,386,434

INTERNAL MIRROR SHIELD, AND METHOD FOR PROTECTING THE MIRRORS OF AN INTERNAL GAS LASER

BACKGROUND OF THE INVENTION

The present invention relates to gas lasers and, more particularly, to a gas laser having a barrier which prevents particulate matter expected to emanate from a surface of a laser component from depositing on a face of an optical element of the laser. (As used herein, the term "gas laser" is meant to encompass both gas and gas ion lasers.) It also relates to a method for protecting the face of such an optical element from particulate matter expected to emanate into the laser optical cavity. It is particularly applicable to an internal mirror laser of the type in which a sealed tube having interior mirror faces is positioned in the optical cavity.

The output power of a gas laser, i.e., the power of the output beam of optical radiation, is greatly affected by the integrity of the faces of optical elements which interact with the optical radiation from which the output beam is formed. This is especially true if the optical element faces are within the same volume which the optical radiation is generated. For example, there is a class of ion lasers which are referred to as internal mirror lasers. In such a laser, the mirrors (or reflectors) for the optical radiation are sealed at the ends of the tube which contains the active gas medium. If deposits or other surface degradation should occur to the face of one or both of the mirrors within the tube, it is generally not possible to clean the same without affecting the integrity of the tube. Contamination of such a mirror face can result in significant decrease in the power of the output beam. This low power level can either result in a rejection of the laser tube at the time of manufacture, or can result in the tube itself having a shorter useful life because the current that must be applied to the tube to reach a required power output is high.

A technique has been developed for aligning the mirrors within an internal mirror construction which can exacerbate the situation. That is, it is common to provide a mirror holder on the tube at each end with a circumferentially weakened wall section which enables the same to be deformed or bent to change the angle on which the optical radiation impinges on the mirror. U.S. Pat. No. 3,826,998 provides a good discussion of this approach. A variation on this approach is described in U.S. Pat. No. 4,217,559. Deformation of the mirror holder at the weakened section results in the surface of the holder at the weakened section interiorly of the tube developing stress during a bending compressive stress on one side and tensile stress on the other side). The result of deformation of this section is that the section surface within the tube gives off particulate matter. Such particulate matter contaminates the inside of the tube and, it is postulated, is transported by the optical radiation to the mirror faces on which such optical radiation impinges. Contamination of these faces reduces the power output. While this phenomenon is not noticeable in low power internal mirror lasers, it is a significant problem for high power lasers of this type.

SUMMARY OF THE INVENTION

The present invention addresses the above problem. In its basic aspects, the invention is a gas laser having a barrier which is generally opaque to the particulate matter, positioned between the component surface responsible for the particulate matter and the remainder of the optical cavity of the laser. It is particularly applicable to protecting the faces of end mirrors in an internal mirror gas laser having a generally closed tube within which the optical radiation is to be generated. If the component surface is provided by a mirror holder of such a tube, the barrier most simply is a sleeve adjacent the section to be deformed, which sleeve is not deformed. Such sleeve acts, in essence, as a trap to prevent any particulate matter which emanates from the deformed area from reaching the mirror faces by migrating into the remainder of the tube and contaminating the same.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 1 is a sectional, somewhat schematic, view of an internal mirror gas ion laser tube made in accordance with the invention; and FIG. 2 is an enlarged view of that portion of the laser of FIG. 1 encircled by the lines 2—2.

DETAILED DESCRIPTION OF THE PREFERRED EMBODIMENT

The following relatively detailed description is provided to satisfy the patent statutes. However, it will be appreciated by those skilled in the art that various changes and modifications can be made without departing from the invention.

With reference to FIG. 1, an argon ion laser is generally referred to by the reference numeral 11. Such laser includes a generally closed or sealed tube 13 made up partially by a cylindrical ceramic portion 14 defining an optical bore 16 for lasing action. The cylindrical portion 14 is of, for example, beryllium oxide and has a gas return path 17. The tube is evacuated and then filled with argon gas to a pressure of between about 1 and 2 torr.

The laser of the invention includes the other normal components found in a gas ion laser, e.g., a gas containment chamber 21 formed of copper or the like at an end of the cylindrical portion 14 for housing the active lasing medium, a discharge cathode 23 and an anode 24.

The optical cavity of a laser is that portion of the same extending between the two mirrors that oscillate the optical radiation. While in an external mirror gas laser in which the mirrors are outside of the gas containment tube the optical cavity extends beyond the containment tube itself, in an internal gas laser of the type illustrated in FIG. 1, the optical cavity is coincident with the tube since the mirrors 18 and 19 are adhered via glass frit or the like directly to the two opposite ends of the tube and act to seal such ends. The optical axis of the laser is represented at 20 and extends through the axial length of the bore 16 between the mirrors 18 and 19. Electrons travel from the cathode through the bore 16 to a collection cup provided by the anode 24. Such electrons will ionize the active medium within the bore and optical radiation will oscillate between the mirrors 18 and 19 as a beam. The optical radiation may interact with other optical elements within its path. For example, a polarizer 25 may be included. Cathode 23 is a coil through which the optical radiation passes. Such coil is held axially on the optical axis by a pair of stocks 26 which extend on opposite sides thereof from a metallic end plate 27 which closes the chamber 21. Only one of the stocks 26 is shown and, as is illustrated, is a two component unit. As is common, a pumpout/gas fill tube 28 is provided extending through end plate 27. The laser further includes a power supply represented at 29 electrically connected between the cathode and anode.

The argon ion laser of FIG. 1 is air cooled and, in this connection, a plurality of fins are provided to facilitate cooling. Such fins are provided in three sets, sets 30 and 31 surrounding and in thermal contact with the ceramic portion 14, and set 32 surrounding and in thermal contact with the anode 24. Each of these sets is made up of a zig-zag pattern 33 of metal which is either sandwiched between cylindrical bands 34 or is open for flow.

As brought out previously, the tube 13 terminates at opposite ends of the optical axis 20 in the end mirrors 18 and 19, one of which, in this case mirror 18, is an output coupler for letting a portion of the optical radiation escape and thereby form the output beam radiation of the laser. Each of the mirrors is held in position by a corresponding mirror holder 34 and 35 to be discussed in more detail hereinafter. The respective mirror holders terminate in a cup-shaped welding flange 36 as is best illustrated in FIG. 2. Each of the flanges 36 mates with a corresponding cup-shaped flange 37 on the remainder of the tube. The flange 37 on the cathode end of the tube is on one end of a tubular extension 38 which projects through the chamber end plate 27. The cup-shaped flange 37 at the opposite end of the laser tube is at the end of a tubular anode stem 39 as illustrated which extends axially outward from anode 23. The tube is connected as is common through spring plates 41 to a support structure (not shown).

Each of the mirror holders 34 and 35 is of a metal, such as a nickel-iron alloy. Each includes a weakened section 42 (see FIG. 2) which can be accessed by a tool to bend the holder and thus adjust the position of the mirror relative to the optical radiation which impinges on its face within the interior of the tube. As discussed previously, this bending or, in other words, deformation, results in the surface 43 at the interior of the tube emitting particulate matter. In this connection, it is recognized that such particulate matter may simply be oxides or other foreign material on the exterior of such surface made loose because of the deformation.

To the point described, the laser is generally conventional and it is well within the skill of the art to provide the same. In keeping with the invention, a mechanical barrier in the form of a sleeve 44 extends axially of the tube for at least the full length of the section 42. It will be seen that such barrier prevents the particulate matter from reaching any optical radiation on axis 20 and, hence, prevents it from being transmitted to the faces of the mirrors inside the tube.

It is preferable that the sleeve 44 extend a significant distance beyond the section 42 as illustrated so that it will provide a long flow path to the remainder of the interior of the tube, for any particulate matter which might emanate from the surface 43. Such sleeve has an outer diameter which is slightly less than the inner diameter of its associated holder, e.g., has an outer diameter of 185"±0.001" whereas the inner diameter of the holder is 188"±0.001". The slight deformation of the holder required to align the mirrors will not affect the sleeve—the sleeve maintains its integrity and acts, in essence, as a trap for the particulate matter.

As mentioned at the beginning of the detailed description, applicants are not limited to the specific embodiment described above. Various changes and modifications can be made. For example, although the sleeve is provided in this particular embodiment extending throughout the full length of the mirror holder, it will be appreciated that it can terminate at any location desired. Moreover, one or both ends of the same can be spot welded or the like to the holder. It can also take various shapes. In this connection, if both ends are spot welded, it is preferable that it be cup-shaped having upturned flanges which are spot welded to the holder. The center or, in other words, sleeve portion of such an arrangement will then act as the trap for particulate matter. The claims, their equivalents and their equivalent language define the scope of protection.

What is claimed is:

1. In a gas laser having an optical cavity,
   (a) a component which includes a surface exposed to the optical cavity of said laser and from which particulate matter which is not transparent to optical radiation is expected to emanate;
   (b) an optical element within said cavity having a face against which a beam of optical radiation on an optical axis of said laser impinges; and
   (c) a barrier generally opaque to said particulate matter which is not transparent to said optical radiation positioned between said component surface and the remainder of the optical cavity including that portion thereof in which said beam is to project.

2. The gas laser of claim 1 wherein said barrier is a mechanical barrier which is generally opaque to said particulate matter.

3. The gas laser of claim 1 having a generally closed tube within which said beam of optical radiation is to be generated, including both said component surface and an optical element face interiorly thereof, said barrier being positioned within said tube between said component surface and the remainder of the interior of said tube.

4. The gas laser of claim 3 further including a power supply coupled to said tube for generating optical radiation from the active gas medium therein.

5. The gas laser of claim 3 wherein said optical element is a laser mirror positioned at the end of said tube with said face internally thereof.

6. The gas laser of claim 5 wherein the active gas medium within said tube is selected from the group consisting of argon, krypton, helium, neon, and mixtures of ions thereof.

7. The gas laser of claim 1 wherein said barrier is a sleeve positioned adjacent said component surface and through which said beam passes.

8. In a gas laser,
   (a) a component which includes a surface exposed to the optical cavity of said laser and from which particulate matter is expected to emanate;
   (b) a trap within said optical cavity for said particulate matter; and
   (c) said gas laser being an internal mirror laser having a generally closed tube for containing the active gas medium, which tube has a mirror positioned at each of its ends having a face which is internally of said tube, said component being a mirror holder at each of said tube ends, each holder having a section which is deformable to change the orientation of the mirror held thereby relative to optical radiation which impinges thereon, said section providing said surface interiorly of said tube from which particulate matter is expected to emanate; and said trap is a sleeve which is positioned adjacent said section surface.

9. In a gas laser having an optical cavity,
(a) a component which includes a surface exposed to the optical cavity of said laser and from which particulate matter is expected to emanate;
(b) an optical element within said cavity having a face against which optical radiation of said laser impinges; and
(c) a barrier generally opaque to said particulate matter positioned between said component surface and the remainder of the optical cavity;
said optical element being a mirror of said laser positioned at the end of a generally closed tube containing a lasing active gas and located within said optical cavity for the generation of a beam of optical radiation on an optical axis of said laser, said mirror face being positioned internally of said tube, and wherein said component is a metallic mirror holder having an interior surface within said tube from which said particulate matter is expected to emanate; and said barrier is a sleeve through which said beam passes, said sleeve being positioned between said beam and said mirror holder interior surface adjacent said surface.

10. The gas laser of claim 9 wherein said mirror holder includes a section which is deformable to change the orientation of a mirror held thereby relative to optical radiation which impinges thereon.

11. In an argon ion gas internal mirror laser which includes an optical tube having a pair of mirror holders respectively at opposite ends of said tube; a pair of mirrors, each of which is held at an associated one of said ends by a corresponding one of said holders and has a face within said tube against which a beam of optical radiation generated within said tube impinges; each of said mirror holders including a section which is deformable to change the orientation of the mirror held thereby relative to said optical beam, said section having a surface exposed to the interior of said tube from which particulate matter is expected to emanate to contaminate said tube; and a sleeve made of a material which is generally opaque to said particulate matter positioned adjacent said section surface between the same and the expected path within said tube of said beam.

12. The internal mirror gas laser of claim 11 wherein the active lasing medium within said tube are argon ions provided by an argon gas.

13. In a method of protecting an optical face of an optical element within a gas laser from particulate matter which is not transparent to optical radiation but is expected to emanate from a component surface into the optical cavity of said laser adjacent said face, the step of trapping said particulate matter with a barrier which is generally opaque to said particulate matter.

14. In a gas laser,
(a) a component which includes a surface exposed to the optical cavity of said laser and from which particulate matter which is not transparent to optical radiation is expected to emanate; and
(b) a trap within said optical cavity for said particulate matter.

15. The gas laser of claim 14 wherein said trap is a mechanical barrier having a material which is generally opaque to said particulate matter.

* * * * *